(12) United States Patent
Madden

(10) Patent No.: US 11,762,906 B2
(45) Date of Patent: Sep. 19, 2023

(54) MODALITY MAPPING FOR VISUAL SEARCH

(71) Applicant: ObjectVideo Labs, LLC, Tysons, VA (US)

(72) Inventor: Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 448 days.

(21) Appl. No.: 17/128,636

(22) Filed: Dec. 21, 2020

(65) Prior Publication Data

US 2021/0191977 A1 Jun. 24, 2021

Related U.S. Application Data

(60) Provisional application No. 62/950,463, filed on Dec. 19, 2019.

(51) Int. Cl.
| | |
|---|---|
| *G06F 16/783* | (2019.01) |
| *G06F 16/732* | (2019.01) |
| *G06N 20/00* | (2019.01) |
| *G06V 40/10* | (2022.01) |
| *G06F 18/211* | (2023.01) |
| *G06F 16/53* | (2019.01) |
| *G06V 10/56* | (2022.01) |
| *G06V 10/143* | (2022.01) |

(52) U.S. Cl.
CPC ............ *G06F 16/784* (2019.01); *G06F 16/53* (2019.01); *G06F 16/732* (2019.01); *G06F 18/211* (2023.01); *G06N 20/00* (2019.01); *G06V 40/10* (2022.01); *G06V 40/103* (2022.01); *G06V 10/143* (2022.01); *G06V 10/56* (2022.01)

(58) Field of Classification Search
CPC ...... G06F 16/784; G06F 16/53; G06F 16/732; G06F 18/211; G06N 20/00; G06V 40/10; G06V 40/103; G06V 10/56; G06V 10/143
USPC ......................................................... 382/165
See application file for complete search history.

(56) References Cited

U.S. PATENT DOCUMENTS

| | | | |
|---|---|---|---|
| 9,679,455 B2 | 6/2017 | Jentoft et al. | |
| 9,734,169 B2 | 8/2017 | Redlich et al. | |
| 10,332,363 B2 | 6/2019 | Cohn et al. | |
| 10,346,706 B2* | 7/2019 | Nonaka | G06V 20/56 |
| 2010/0128058 A1* | 5/2010 | Kawabata | H04N 21/84 |
| | | | 345/593 |
| 2013/0226892 A1* | 8/2013 | Ehsani | G06F 16/90332 |
| | | | 707/706 |

* cited by examiner

*Primary Examiner* — Gabriel I Garcia
(74) *Attorney, Agent, or Firm* — Fish & Richardson P.C.

(57) ABSTRACT

Methods, systems, and apparatus, including computer programs encoded on computer storage media, for integrating a monitoring system with one or more air quality sensors. The method includes obtaining a request that includes an indication of an appearance of an object, selecting a first set of images in an initial modality based on the indication of the appearance of the object, determining an additional set of images in a different modality based on mappings between the first set of images and the additional set of images; and providing the first set of images and the additional set of images in response to the request.

20 Claims, 3 Drawing Sheets

FIG. 3

OBTAIN A REQUEST THAT INCLUDES AN INDICATION OF AN APPEARANCE OF THE OBJECT  _302_

BASED ON THE INDICATION OF THE APPEARANCE OF THE OBJECT, SELECT A FIRST SET OF IMAGES IN AN INITIAL MODALITY  _304_

DETERMINE AN ADDITIONAL SET OF IMAGES IN A DIFFERENT MODALITY BASED ON MAPPINGS BETWEEN THE INITIAL AND ADDITIONAL SET OF IMAGES  _306_

PROVIDE THE FIRST SET OF IMAGES AND ANY ADDITIONAL SETS OF IMAGES IN RESPONSE TO THE REQUEST  _308_

MODALITY MAPPING FOR VISUAL SEARCH

CROSS-REFERENCE TO RELATED APPLICATION

This application claims the benefit of U.S. Provisional Application No. 62/950,463, filed on Dec. 19, 2019, the contents of which are incorporated by reference herein in its entirety.

BACKGROUND

A monitoring system for a property can include various components including sensors, cameras, and other devices. For example, the monitoring system may use the camera to capture images of people that enter the property.

SUMMARY

This specification describes techniques, methods, systems, and other mechanisms for modality mapping for visual search. In a multi-camera video monitoring system, it may be useful to search for a person or other item by appearance, particularly color. This can be done, for example, by selecting the person in a video clip and asking the system to find the indicated person in other clips, times, or camera views—or by descriptors such as "red shirt, blue pants".

In a multiple modality system, such as one where cameras switch from Red, Green, Blue (RGB) to infrared (IR) or IR with illuminators when and where light is low, the appearance of persons and objects will change between modalities. For example, in the IR mode, the visible colors are absent, and the brightness of each object depends on its reflectance in a certain IR band, which for a given material can be similar or dissimilar to its reflectance in the visible bands. A modality may refer to a range of electromagnetic radiation that is sensed. There may be no constant mapping from one modality to another (e.g., RGB luminance to IR luminance).

Even in RGB mode, changes in amount or color of lighting can drastically affect the appearance of people and objects. A "white" shirt may look blue under cool lighting and yellow under warm lighting, for example. Again, different materials shift in different ways, which may make it difficult to use a simple function to map from one lighting condition to another.

A system may address these problems, extending the benefits of appearance-based video search across cameras, modalities and lighting conditions through a number of mechanisms. The system may gather as many correlations as possible for each observed person and build a mapping of how that person appears (or might appear) in a given modality or lighting condition. Similar lighting conditions can be grouped by the system and be treated as a single group (e.g., bright sunny day and naturally lit living room). Lighting conditions can exist within other modalities (e.g., RGB mode, IR mode).

The system may analyze video, detect people or other subjects, and build appearance models which are stored to be searched for later. These models might be as simple as a range of color or brightness values for various parts of the subject, or include various image features (such that the print on a shirt might be used as a characteristic to re-identify a person), and can be compared against other models to get a similarity score.

The system may learn from user input which mappings are beneficial to object recognition and which mappings produce false positives. The system can analyze the mappings between modalities and prune those that are likely to produce numerous false positives. Furthermore, the system may reinforce useful mappings between certain objects either through artificial learning or manual changes. For example, dark blue pants tend to be denim jeans and denim jeans tend to reflect IR in a similar fashion. The system can generalize blue pants search as being inclusive to a denim jean search in IR modality. The system need not subscribe to this generalization, or others, exclusively but can use it with regard to an attached confidence factor expressing the likelihood a certain match will return a majority of true positives.

In one aspect, the disclosure provides a method including obtaining a request that includes an indication of an appearance of an object; selecting a first set of images in an initial modality based on the indication of the appearance of the object; determining an additional set of images in a different modality based on mappings between the first set of images and the additional set of images; and providing the first set of images and the additional set of images in response to the request.

In some implementations, determining the additional set of images in the different modality based on the mappings between the first set of images and the additional set of images includes determining a first image in the initial modality in response to the request, wherein the first set of images includes the first image; determining a first mapping that includes the first image and at least a second image in the different modality; and identifying the additional set of images in the different modality based on at least the second image in the different modality.

In some implementations, identifying the additional set of images in the different modality based on at least the second image in the different modality includes performing an image based search using the second image in the different modality as a search criteria of the image based search; and identifying the additional set of images in the different modality based on performing the image based search.

In some implementations, the method further includes determining a third set of images in a third modality based on mappings between the additional set of images and the third set of images; and providing the third set of images in response to the request. In some implementations, the third modality is equivalent to the initial modality.

In some implementations, providing the first set of images and the additional set of images in response to the request includes grouping two or more images of the first set of images and the additional set of images corresponding to an event; and providing the grouped images of the first set of images and the additional set of images and data corresponding to the event in response to the request.

In some implementations, the method further includes identifying a first mapping comprising the two or more images, wherein the first mapping is associated with the event; and determining the two or more images of the first set of images and the additional set of images correspond to the event based on identifying the first mapping.

In some implementations, providing the grouped images of the first set of images and the additional set of images and the data corresponding to the event in response to the request includes providing an indication that the grouped images of the first set of images and the additional set of images correspond to the event.

In some implementations, the data corresponding to the event includes an event identification number associated with the event.

In some implementations, the mappings between the first set of images and the additional set of images include at least a first mapping stored in a mapping database where the first mapping includes (i) a first image in the initial modality, (ii) a second image in the different modality, and (iii) an event identification corresponding to an event that is depicted, at least in part, by the first image and the second image.

In some implementations, the first mapping is based on temporal correlation and the first image is temporally correlated with the second image.

In some implementations, the first mapping is based on object detection and the first image depicts at least one object in the initial modality and the second image depicts the at least one object in the different modality. In some implementations, the initial modality includes Red, Green, Blue (RGB) based images. In some implementations, the different modality includes infrared (IR) based images.

In some implementations, the mappings are generated by an algorithm trained using one or more training images in the initial modality and one or more training images in the different modality.

In some implementations, the first set of images and the additional set of images include segments of captured video.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a flow diagram illustrating an example of a process for modality mapping for visual search.

Like reference numbers and designations in the various drawings indicate like elements.

DETAILED DESCRIPTION

Figure 1:
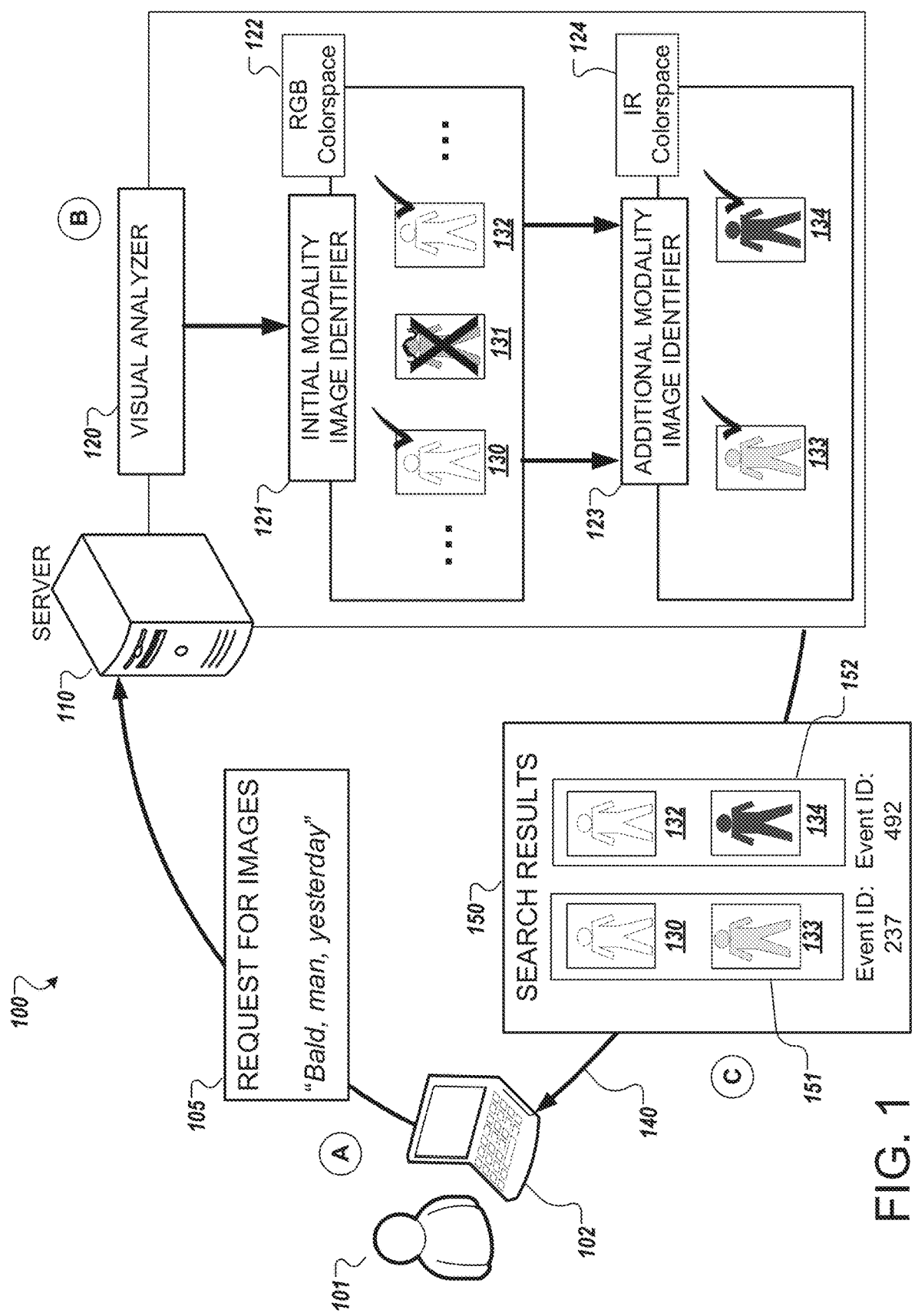
FIG. 1 is a diagram showing an example of a system for modality mapping within a visual search.

FIG. 1 is a diagram showing an example of a system 100 for modality mapping in visual search. The diagram is separated into three separate stages, A, B and C.

Stage A in FIG. 1 depicts user 101 using device 102 to request images from server 110. The request is a text based search containing the words, "Bald, man, yesterday" as shown in item 105. The request is sent through a network to server 110.

Additionally or alternatively, in some implementations, the request 105 may be an image based search or other form of request to the server 110. For example, a request may include a portion of an image that shows a person. The portion of the image which shows the person can be the result of an image crop or selection by the user or the system. The request can be for other images showing the person or other images which are similar. Other forms of criteria, as well as other criteria, can be used. For example, audio based search using speech to text recognition can be used.

In some implementations, the request can originate from another external source. The request can also originate internally from within the system 100. For example, users can use a variety of connected devices to perform searches within a system. Similarly, the system itself can invoke searches to be performed for maintenance, algorithm enhancement, or as part of other searches.

Stage B in FIG. 1 depicts a visual analyzer 120 located within memory of server 110. The request for images is used as input for the visual analyzer 120. The visual analyzer 120 is composed of various image processors and visual algorithms used to identify visual data, including images, which correspond to certain criteria. The visual analyzer 120 can contain an initial modality image identifier 121 which can be used to find images that match the request and correspond to the initial modality. In FIG. 1, the initial modality is RGB. This setting is depicted in item 122. Visual analysis is used within the initial modality image identifier 121 to choose which images within the image database matches the request 105. Images 130 and 132 match while the image 131, and many others not shown, do not match.

In some implementations, the visual analyzer 120 can contain additional steps used to process and prepare relevant data. Additional steps can include more image identifiers for multiple modality mappings. Another image identifier can be used after or before the additional modality identifier 123. More than one additional image identifier can be used for mapping images with more than one modality mapping. For example, image 132 could have a modality mapping in both IR modality and an overcast day lighting condition. Both mappings could have their own mapping identifiers.

Additional steps used to process and prepare relevant data could also include filters for images which match criteria. These filters could be used to prevent false positives, prevent particular mappings from forming, or exclude certain image captures from output. For example, the system could reject images where the visual data is corrupted or altered in some way. This could be either through a hardware imperfection (e.g., camera, camera lens, data storage) or software bug creating images with defects. The filters could also prevent sensitive or explicit content from being viewed on specific devices or all devices. Filter settings may be changed by the user or system.

The initial modality image identifier 121 can invoke an additional modality image identifier 123 within the modality 124. In some implementations the additional modality can be IR. Mappings can be generated between RGB and IR by capturing both an RGB and IR image of the same event. For example, a camera can detect a person entering the field of view using RGB and, in response, capture an IR image and store both the RGB and IR images as a mapping on the system 100. The additional modality image identifier 123 can find the stored mapping on the system 100 which corresponds to an RGB image found in the initial modality image identifier 121. The additional modality mapping can provide an additional image for each of the images found in the initial modality image identifier 121. The additional image can be an image capturing the same event in a different modality.

In some implementations, the additional image found in the additional modality image identifier can be the result of a preexisting match between an image of one modality and an image of another modality. The preexisting match can be created by capturing an image of one event with a camera, changing camera modalities, and capturing another image of the same event. These two images can be stored on the system as, not two events, but a single event captured in two modalities.

The images of a mapping need not be from the same camera. Multiple cameras in a system can coordinate multiple modality image capture. For example, a camera can capture an image of a man walking across a room into a second room. A camera in the second room can capture an image of the man entering from the first room. By comparing time stamps, motion patterns, or other visual characteristics of the images, the system may determine that these events, captured by two different cameras in two different rooms, correspond to the same event of a single man walking through the house. Images of any modality captured of the event could then be mapped together in relation to a single object, the man, and a single event, the man walking through the house.

In some implementations, the additional image found in the additional modality image identifier can be the result of a matching algorithm. For example, from a given image, a mapping can be made based on other images of varying modalities within the system's database. Mappings can be made between objects based on visual similarities, other known mappings, temporal correlation, or other traits. The mappings can, but need not be, temporally collocated. For example, a woman in a red dress captured in an image on Tuesday, may be captured again in an image on Friday. Images captured of each event could be mapped to one another in the case that multiple modalities were captured. For example, one image may have been captured in a house with lighting using RGB modality, another may have been captured outside with IR sensors. Search terms of woman and red dress could return both RGB and IR images related to these temporally separated events.

In some implementations, the initial modality can be IR. The initial modality can be any modality able to be processed by the system. The additional modality, and any further additional modalities, can also be any modality able to be processed by the system. Modality can work with specific lighting conditions (e.g., artificial lighting, dusk outside, midday outside) and their effect can produce multiple mappings for a captured image. For example, RGB sensors can be used for both midday and dusk image captures however the lighting condition associated with each may be different. A white shirt captured at midday outside may appear white in RGB. The same white shirt captured at dusk outside may appear more orange or yellow. A mapping can be made between the two events using other data and objects within the image and system.

In some implementations, alternate light conditions can be used within image mappings for search. Alternate light conditions can be perceived with time stamps, ambient light sensors, other system data, or sensor data. For example, an image of a man on a sunny street at 12:00 PM can be saved with a corresponding time stamp and weather condition and be classified under a different lighting condition (e.g., bright midday) than an image of a man on the street at 9:00 PM (e.g., night). Weather conditions can be included in the logical determination of lighting condition making, for example, overcast days separate from sunny days. The system can learn to associate similar lighting conditions as effectively the same (e.g., bright midday and naturally lit living room) and use mapping techniques to correlate disparate lighting conditions (e.g., bright midday and night, bright midday and overcast). These lighting conditions can invoke other modalities. For example, IR enabled sensors can be enabled when a camera determines there is insufficient light for RGB images.

Stage C in FIG. 1 depicts the search results output 150 of visual analyzer 120. The search results contain two events. Each event contains two images, one for each modality. Item 151 contains image 130, an RGB image found within the initial modality image identifier 121, and image 133, an IR image found within the additional modality image identifier 123. Item 152 contains image 132, an RGB image found within the initial modality image identifier 121, and image 134, an IR image found within the additional modality image identifier 123. The events shown as search results output 150 match the criteria specified within the image request 105. The search results are sent through connection 140 to device 102 for the user to view.

In some implementations, the search results 150 can be viewed on a user device (e.g., smartphone, desktop computer, TV). Search results can be viewed on multiple devices simultaneously. For example, a search conducted on a smartphone can send output results to both the smartphone and a TV connected to the system.

In some implementations, the search results can contain additional or less information. For example, event ID's can be included or excluded. In place of ID numbers, other signifiers can be used. Images can include video snippets or links to captured video. Text based output based on visual analysis can be used. For example, a caption compiled by visually analyzing images or video snippets can be included within the results. Alternate output viewing options can be configured by the user or the system.

In some implementations, the search results can be stored as data instead of, or in addition to, being displayed. The data storage can be on the system itself or another remote location. For example, the system may run background searches to help train onboard algorithms in various mapping techniques. A search can be performed and the results sent to a central server where the results are processed. The background searches can be performed at the user's will or as part of system enhancement or maintenance.

In some implementations, a user's response to matches can inform further enhancement or maintenance to the search algorithms. The matches about which the user gives feedback can be matches instigated by user searches or system searches. For example, the user may search for bald man images. The system may proceed as described and output a set of images. The user can mark images which, in the user's view, do not match the given criteria. The system can use the feedback to train its search algorithms or give the feedback to a central server to improve its, or other systems', search algorithms.

Figure 2:
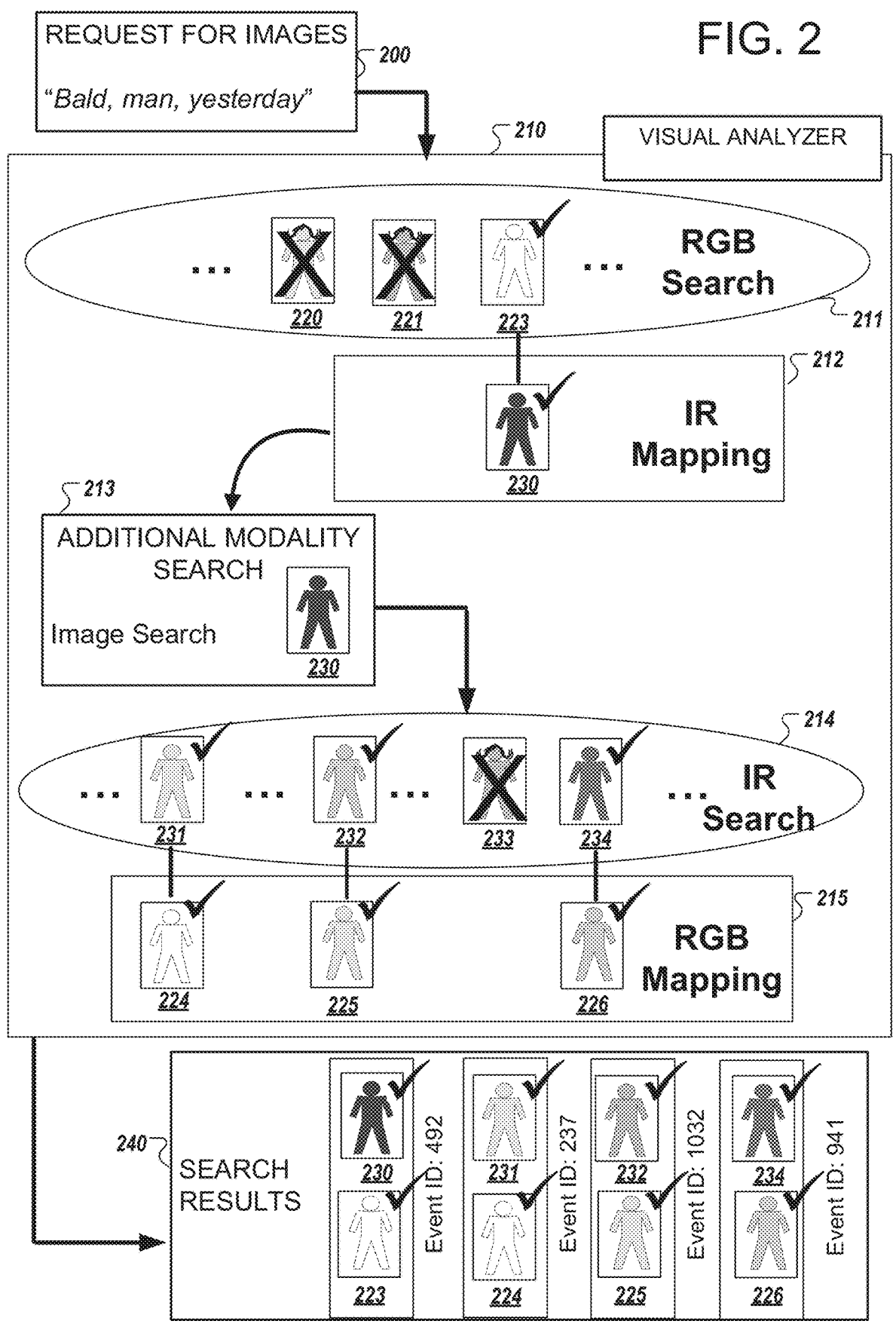
FIG. 2 is a diagram showing an example of additional modality searches.

FIG. 2 depicts a visual analyzer 210 receiving a request for images 200.

The visual analyzer 210 first runs an image search within the RGB modality 211. Image 223 matches the criteria of request 200. Images 220 and 221, as well as others not shown, do not match the criteria.

In some implementations, the first search need not be a search within the RGB modality. For example, in FIG. 2, the initial search could be within the IR image space and the second could be within the RGB image space. Any modality able to be processed by the system may be used.

From the RGB modality search 211, a mapping to a separate modality, in this example, IR, can be made. The image 230 represents the IR mapping to the RGB image 223.

In some implementations, another modality can be used for mapping. Multiple mappings can also be used. If a system had multiple mappings for an image found within an initial search, the multiple mappings could be used as input for additional modality searches. These could include alternate lighting conditions. For example, a bright midday image capture of a person could map to the same person in an IR image and an overcast image. Both mappings could be used within separate modality searches.

Item 213 in FIG. 2 depicts an additional modality search. The criteria used can be the image 230 which represents the IR mapping to the RGB image 223. Item 214 depicts another search within an additional modality using 230 as criteria for an image based search. Images may be processed with various visual algorithms designed to detect similarities between images. The additional modality in this example is IR. The search 214 finds three other IR images which match the search criteria. The three images are images 231, 232, and 234. Image 233, as well as other images not shown, do not match the search criteria. Each of the criteria matching images can be mapped to a corresponding image in the RGB modality. This process is depicted in item 215. Image 224 from the RGB modality maps to image 231 of the IR modality. Image 225 of the RGB modality maps to image 232 of the IR modality. And image 226 of the RGB modality maps to image 234 of the IR modality.

In some implementations, the number of matches may be higher or lower. This can depend on various factors including, but not limited to, search terms, system setup, algorithm setup, and CPU bandwidth. For example, very broad search terms may return many events as output results. The system can be setup to have higher or lower tolerance for false positives which can impact the amount of resulting images. Specific changes to the algorithm (e.g., additional filters, additional rounds of machine learning) can impact the number of results for a given query. The system can also have CPU limitations restricting the depth of a search resulting in more or fewer results.

Once the additional modality search 213 is complete, and no further searches are required, the visual analyzer 210 can output search results 240 which contain all matches found. First, the matches from the initial RGB search 211 can be shown. In this example, there is only one match that of image 223 and image 230. These two images correspond to the single event represented by ID number 492. Next, the matches from the additional IR search 214 can be shown. In this example three matches were found. Image 231 matches to image 224 and represents the single event represented by ID number 237. Image 232 matches to image 225 and represents the single event 1032. Image 234 matches to image 226 and represents the single event 941.

In some implementations, the number of total matches can be different. For example, given a search request criteria and a set of RGB images to search, the initial modality identifier can deliver any number of matching images. In item 211 of FIG. 2, images 220 and 221 could match criteria together with 223. In this case, all three mappings, the IR images corresponding to 220 and 221, not shown, together with the IR image 230, could be taken as input into the additional modality search 213.

In some implementations, the modalities which qualify for search results can be different. For example, a system can set no additional modality searches. In that case, event ID 492, represented by image 230 and 223, could be output and event IDs 237, 1032 and 941 could be excluded.

FIG. 3 is a flow diagram illustrating an example of a process 300 for modality mapping for visual search. The process 300 may be performed by one or more electronic systems, for example, the server 110 of FIG. 1.

The process 300 includes obtaining a request that includes an indication of an appearance of the object (302). For example, the server may obtain the request 105 from the device 102 where the request 105 includes the terms "bald, man, yesterday."

The process 300 includes selecting a first set of images in an initial modality based on the indication of the appearance of the object (304). For example, the server 110 may, based on the terms "bald, man, yesterday" select the images 130 and 132.

The process 300 includes determining an additional set of images in a different modality based on mappings between the initial and additional set of images (306). For example, IR image 230 mapped to the RGB image 223 may be included in the search results for search criteria corresponding to RGB image 223. Furthermore, additional searches may be performed to include additional images. For example, the mapped IR image 230 may be used within an image search 214 to find similar images within a modality like images 231, 232 and 234. Furthermore, the additional searches can produce additional mappings which lead to additional searches and additional mappings. For example, the additional search 214 can lead to mappings 215.

In some implementations, the additional set of images is determined based, at least in part, by a first image of the initial set of images. For example, the visual analyzer 210 runs an image search within the RGB modality 211. The visual analyzer 210 determines that the image 223 matches the criteria of the request 200. An entity performing the operations corresponding to the visual analyzer 210, such as the server 110 of FIG. 1, can determine a mapping between the image 223 of the RGB modality and the image 230 of the IR modality. In some implementations, the mapping between the image 223 of the RGB modality and the image 230 of the IR modality is pre-generated based on visual similarities, temporal correlation, or other features within both the image 223 and the image 230. In other implementations, an entity, such as the server 110, generates the mapping between the image 223 of the RGB modality and the image 230 of the IR modality in response to the image 223 matching the criteria of the request 200. Based on the image 230 of the mapping between the image 223 and the image 230, the visual analyzer 210 can determine the additional set of images.

In some implementations, the additional set of images is determined based on the image 230 by performing a search operation. For example, as shown in the example of FIG. 2, the visual analyzer 210 performs an additional modality search 213 based on the image 230. In some implementations, the image 230 is used as a search criteria in order to identify images related to the image 230 within the additional modality such as the IR modality. Images may be related to one another if the images include similar objects or the same objects, depict similar events or the same event, or have been labeled as related by a user or other system such as an automated system. For example, images within the IR modality that include objects related to objects within the image 230, such as the same or same type of object, can be identified by the additional modality search 213. Furthermore, images within the IR modality that are temporally correlated with the image 230, such as images captured within a predetermined amount of time before or after when the image 230 was captured, can be identified by the additional modality search 213. In the example of FIG. 2, the additional set of images includes image 231, 232, and 234.

In some implementations, a third set of images is determined based on identified images of a search operation. For example, the visual analyzer 210 can perform the additional modality search 213 based on the image 230 and identify images related to the image 230. The images related to the image 230 can be referred to as the additional set of images of the IR modality. A third set of images can be identified based on one or more images of the images related to the image 230. For example, the third set of images can be determined based on RGB mappings from the one or more images of the images related to the image 230 to images of another modality, such as the RGB modality as shown in item 215 of the example of FIG. 2. In the example of FIG. 2, images of the RGB modality that are mapped to images identified by the additional modality search 213 based on the image 230 can be identified as the third set of images. In the example of FIG. 2, the third set of images includes image 224, image 225, and image 226.

In some implementations, the third set of images are used to perform subsequent modality searches. For example, similar to the additional modality search 213 of FIG. 2, the visual analyzer 210 can use one or more images of the third set of images to identify one or more related images in the RGB modality or another modality. The one or more images of the third set of images can be used as search criteria in order to identify images related to the one or more images of the third set of images. Any other modality able to be captured by a camera or other sensor on a property can replace either the RGB modality or the IR modality in the examples shown in FIG. 1 and FIG. 2. For example, instead of the initial search in FIG. 2 identifying images in the RGB modality, an initial search can identify images captured in other modalities, such as ultraviolet or any other mode of a camera or sensor used to capture data, such as images.

The process 300 includes providing the first set of images and any additional sets of images in response to the request (308). For example, search results 150 which include images 130 and 133 of event ID 237 as well as images 132 and 134 of event ID 492.

In some implementations, two or more images corresponding to an event are provided in response to the request. For example, as shown in FIG. 2, the request 200 of "bald, man, yesterday" can result in one or more searches of one or more modalities to identify images related to the request 200. Search results, such as the search results 240, can group two or more images corresponding to the same event such that a user is presented with images organized by event. The event can include a person walking into a house or a car pulling out of a driveway among others. The event can include images of multiple modalities such as an image in the RGB modality and an image in the IR modality. In some implementations, the events or identified by a numerical value. For example, as shown in the search results 240, events 492, 237, 1032, and 941 each correspond to a group of related images. In this case, the images are related by a common event depicted, at least in part, by the images. For example, the event 492 corresponds to the image 230 in the IR modality and the image 223 in the RGB modality. Both the image 230 and the image 223, in this example, correspond to the event 492.

In some implementations, search results are provided to a user for viewing on an electronic device. For example, as shown in FIG. 1, the device 102 of the user 101 can be used to display results, such as the search results 240 of FIG. 2, in response to a request, such as the request 200 of FIG. 2. In some implementations, the search results 240 include an indication that two or more images of the identified images in the RGB modality and the IR modality correspond to the same event. The indication can be sent to a device, such as the device 102 of the user 101 such that the user can view related images based on one or more events. In some implementations, events are represented by unique identifiers such as numerical values. For example, the search results 240 of FIG. 2 show a first event represented by the event ID 492. The ID '492' corresponds to the event that is at least partially depicted by the image 230 and the image 223.

In some implementations, other images identified in response to a request can be provided to a user. For example, in addition or instead, of the images in the RGB modality and the IR modality included in the search results 240, the visual analyzer 210 can identify images of a third set that can be of a modality different from the RGB modality and the IR modality. The third set of images can be provided to the user as described in this specification. If images of the third set of images correspond to events of other images in the search results 240, the images of the third set of images can be added to groups based on corresponding events such that the images of the third set of images corresponding to a first event can be matched with other images not in the third set of images that also correspond to the first event. A resulting group can be provided to the user. In some implementations, the user is provided images that are not grouped by event. For example, images may be presented temporally with more recently captured images displayed before images captured later.

In some implementations, mappings are temporally correlated. For example, as shown in FIG. 2, the image 223 and the image 230 are included in a mapping. The image 223 is in the RGB modality and the image 230 is in the IR modality. The image 223 is temporally correlated with the image 230. In this example, the image 223 was taken at timestamp A and the image 230 was taken at timestamp B. The difference between the timestamp A and the timestamp B is less than a predetermined difference and the image 223 and the image 233 can be mapped based on the difference between the timestamp A and the timestamp B. In some implementations, mappings can be correlated with events. For example, in some cases, the image 223 and the image 233 are determined to correspond to the same event in part because the image 223 and the image 233 are temporally correlated. The image 223 and the image 230 need not be captured by the same sensor. For example, a first sensor in one are of a property can capture the image 223 and a second sensor in another area of the property can capture the image 230. The image 223 and the image 230 can still be mapped, for example, if the image 223 and the image 230 are temporally correlated or depict at least a portion of the same object.

In some implementations, mappings include two or more images that depict at least a portion of the same object. For example, the image 234 and the image 226 can depict at least a portion of the same object. For explanation purposes, the image 234 and the image 226 can be said to depict at least a portion of a man that is bald. Object detection performed on the image 234 and the image 226 can determine that both images depict the head of a man that is bald. Based on the image 234 and the image 226 both depicting the head of a man that is bald, an entity such as the server 110 of FIG. 1, can generate a mapping between the image 234 and the image 226. The image 234 and the image 226 need not be temporally correlated but can be temporally correlated.

In some implementations, images that share more objects or that are more closely temporally correlated than other groups of images, are mapped together. For example, the image 234 and the image 226 can both depict, not only the head of a man that is bald but the torso of a man that is wearing a white shirt. Based on the image 234 and the image 226 sharing both the detected objects of the head of a man that is bald and the torso of a man that is wearing a white shirt, an entity, such as the server 110 of FIG. 1, can map the image 234 and the image 226 together instead of mapping the image 234 and another image, such as the image 225, where the image 234 and the other image only share the detected object of the head of a man that is bald. For another example, images that are separated by less time, as determined by a difference of timestamps, can be mapped together over other images separated by more time. In some implementations, multiple features or considered to determine mappings. For example, an entity, such as the server 110, can determine to map a first image with a second image based not only on temporal correlation but of shared detected objects.

In some implementations, an algorithm is trained to generated mappings. For example, as discussed above, many factors can contribute to two or more images of one or more modalities being mapped together. In order to map figures more efficiently and accurately, an algorithm can be trained to map two or more images together based at least in part on detected objects in the two or more images or temporal correlation. In some implementations, a user provides input in the training process. For example, an entity, such as the server 110 of FIG. 1, can generate a mapping between a first image and a second image. The mapping can be provided to the user. The user can determine whether or not the mapping is legitimate or not and provide feedback to the server 110. Similarly, an algorithm can be trained based on an established set of legitimate mappings. Legitimate mappings can include two or more images of objects, such as articles of clothing of a specific color, that occur in the two or more images or two or more images that are temporally correlated.

In some implementations, images can include video snippets or links to captured video. For example, the RGB modality search 211 of FIG. 2 can include video snippets that include two or more images. In some implementations, the video snippets are mapped to other video snippets of the same or different modalities. For example, a video snippet captured in the RGB modality can be mapped to a video snippet captured in the IR modality. In some implementations, search criteria, such as the search criteria used in the additional modality search 213, includes video snippets or links to captured video.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method comprising:
obtaining a request that includes an indication of an appearance of an object;
selecting a first set of images in an initial modality based on the indication of the appearance of the object;
determining an additional set of images in a different modality based on mappings between the first set of images and the additional set of images; and
providing the first set of images and the additional set of images in response to the request.

2. The method of claim 1, wherein determining the additional set of images in the different modality based on the mappings between the first set of images and the additional set of images comprises:
determining a first image in the initial modality in response to the request, wherein the first set of images comprises the first image;
determining a first mapping that comprises the first image and at least a second image in the different modality; and
identifying the additional set of images in the different modality based on at least the second image in the different modality.

3. The method of claim 2, wherein identifying the additional set of images in the different modality based on at least the second image in the different modality comprises:
performing an image based search using the second image in the different modality as a search criteria of the image based search; and
identifying the additional set of images in the different modality based on performing the image based search.

4. The method of claim 1, further comprising:
determining a third set of images in a third modality based on mappings between the additional set of images and the third set of images; and
providing the third set of images in response to the request.

5. The method of claim 4, wherein the third modality is equivalent to the initial modality.

6. The method of claim 1, wherein providing the first set of images and the additional set of images in response to the request comprises:
grouping two or more images of the first set of images and the additional set of images corresponding to an event; and
providing the grouped images of the first set of images and the additional set of images and data corresponding to the event in response to the request.

7. The method of claim 6, further comprising:
identifying a first mapping comprising the two or more images, wherein the first mapping is associated with the event; and
determining the two or more images of the first set of images and the additional set of images correspond to the event based on identifying the first mapping.

8. The method of claim 6, wherein providing the grouped images of the first set of images and the additional set of images and the data corresponding to the event in response to the request comprises providing an indication that the grouped images of the first set of images and the additional set of images correspond to the event.

9. The method of claim 6, wherein the data corresponding to the event comprises an event identification number associated with the event.

10. The method of claim 1, wherein the mappings between the first set of images and the additional set of images comprise at least a first mapping stored in a mapping database, wherein the first mapping comprises (i) a first image in the initial modality, (ii) a second image in the different modality, and (iii) an event identification corresponding to an event that is depicted, at least in part, by the first image and the second image.

11. The method of claim 10, wherein the first mapping is based on temporal correlation and the first image is temporally correlated with the second image.

12. The method of claim 10, wherein the first mapping is based on object detection and the first image depicts at least one object in the initial modality and the second image depicts the at least one object in the different modality.

13. The method of claim 1, wherein the initial modality comprises Red, Green, Blue (RGB) based images.

14. The method of claim 1, wherein the different modality comprises infrared (IR) based images.

15. The method of claim 1, wherein the mappings are generated by an algorithm trained using one or more training images in the initial modality and one or more training images in the different modality.

16. The method of claim 1, wherein the first set of images and the additional set of images comprise segments of captured video.

17. A system comprising one or more computers and one or more storage devices on which are stored instructions that are operable, when executed by the one or more computers, to cause the one or more computers to perform operations comprising:

obtaining a request that includes an indication of an appearance of an object;

selecting a first set of images in an initial modality based on the indication of the appearance of the object;

determining an additional set of images in a different modality based on mappings between the first set of images and the additional set of images; and providing the first set of images and the additional set of images in response to the request.

18. The system of claim 17, wherein determining the additional set of images in the different modality based on the mappings between the first set of images and the additional set of images comprises:

determining a first image in the initial modality in response to the request, wherein the first set of images comprises the first image;

determining a first mapping that comprises the first image and at least a second image in the different modality; and identifying the additional set of images in the different modality based on at least the second image in the different modality.

19. The system of claim 18, wherein identifying the additional set of images in the different modality based on at least the second image in the different modality comprises:

performing an image based search using the second image in the different modality as a search criteria of the image based search; and identifying the additional set of images in the different modality based on performing the image based search.

20. A non-transitory computer storage medium encoded with instructions that, when executed by one or more computers, cause the one or more computers to perform operations comprising:

obtaining a request that includes an indication of an appearance of an object;

selecting a first set of images in an initial modality based on the indication of the appearance of the object;

determining an additional set of images in a different modality based on mappings between the first set of images and the additional set of images; and providing the first set of images and the additional set of images in response to the request.

* * * * *